No. 787,993. PATENTED APR. 25, 1905.
H. ROHRDANTZ.
GUARD FOR SCARF PINS, &c.
APPLICATION FILED OCT. 29, 1903. RENEWED SEPT. 13, 1904.
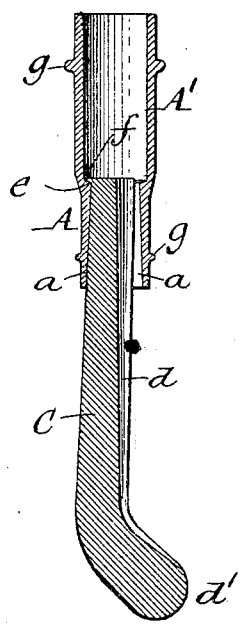
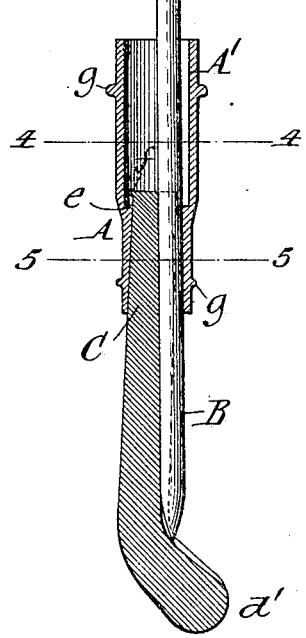
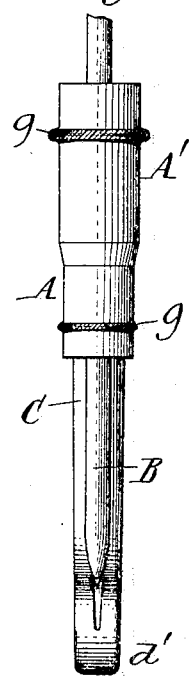
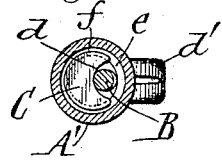
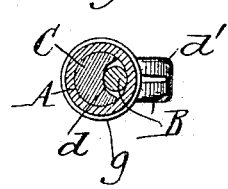
Witnesses:
Louis W. Gratz.
Robert Weitknecht.
Henry Rohrdantz,
Inventor
By Geyer & Popp
Attorneys.

No. 787,993.

Patented April 25, 1905.

UNITED STATES PATENT OFFICE.

HENRY ROHRDANTZ, OF BUFFALO, NEW YORK.

GUARD FOR SCARF-PINS, &c.

SPECIFICATION forming part of Letters Patent No. 787,993, dated April 25, 1905.

Application filed October 29, 1903. Renewed September 13, 1904. Serial No. 224,298.

*To all whom it may concern:*

Be it known that I, HENRY ROHRDANTZ, a citizen of the United States, residing at Buffalo, in the county of Erie and State of New York, have invented new and useful Improvements in Guards for Scarf-Pins, &c., of which the following is a specification.

This invention relates to the guards or retainers employed for preventing loss or withdrawal of garment-pins of various kinds, such as scarf-pins and hat-pins.

The object of my invention is the provision of a neat, simple, and reliable guard of this kind which can be readily fastened and released and which can be manufactured at small cost.

In the accompanying drawings, Figure 1 is a longitudinal section of the detached guard on an exaggerated scale. Fig. 2 is a similar view showing the device applied to a pin. Fig. 3 is a front elevation of the guard applied to a pin. Figs. 4 and 5 are transverse sections in lines 4 4 and 5 5, Fig. 2.

Similar letters of reference indicate corresponding parts throughout the several views.

A indicates a sleeve forming the body of the guard and adapted to be passed over the lower portion of the pin B.

C is a wedge arranged lengthwise in the lower portion of the sleeve A and serving to clamp the pin within the latter, thereby securely fastening the sleeve to the pin and preventing the pin from being lost or forcibly withdrawn from a scarf or other article without detection by the wearer. The wedge is preferably cylindrical and provided in one side with a longitudinal groove or depression $d$, which receives the pin and which gradually increases in depth toward the inner or front end of the wedge, so that the pin is clamped against the opposing wall of the sleeve A upon forcing the wedge into the same, as shown in Figs. 2, 4, and 5. In order to provide a large and effective bearing-surface for the wedge against the interior of the sleeve, the lower portion of the latter is flared toward its lower or rear end, as shown at $a$. By this construction the wedge when tightened has an extensive bearing both against the sleeve and the pin and reliably clamps the sleeve upon the pin.

The lower or outer end $d'$ of the wedge is preferably bent laterally, as shown, for forming a guard for the point of the pin and preventing injury to the wearer's fingers in applying and removing the guard-sleeve A. The angular end $d'$ is arranged on the same side of the wedge as the groove $d$. This angular end also forms a convenient means for seizing the wedge in tightening and loosening it. The front or upper portion $A'$ of this sleeve is enlarged to form an internal shoulder $e$, and the wedge C extends above this shoulder and is provided at its upper end with a stop lip or flange $f$, adapted to encounter said shoulder for preventing complete withdrawal and loss of the wedge.

Before applying my improved guard to a scarf-pin or the like the wedge is withdrawn to its limit, as shown in Fig. 1. After passing the guard-sleeve A over the pin the wedge is forced into the sleeve for clamping the latter upon the pin, this being most conveniently and effectively done by turning the wedge and at the same time forcing it farther into the sleeve. To facilitate this operation, the sleeve is provided with one or more knurled beads $g$. In order to release the guard, the wedge is simply turned in the sleeve and at the same time withdrawn, when the wedge will be loosened and permit the guard to be stripped from the pin.

The enlarged portion $A'$ of the guard-sleeve forms a hood which incloses the flanged inner end of the wedge, thus improving the appearance of the device. This hood or extension may be short or long, as desired. When the device is designed to be applied to different kinds of pins varying more or less in diameter, the wedge when tightened will extend a greater or less distance above the flaring portion of the guard-sleeve, and in that case it is necessary to make the hood $A'$ longer than in a device constructed to receive pins varying but slightly in diameter.

As the device consists of but two parts, it can be produced at a low cost.

I claim as my invention—

1. A pin-guard, comprising a sleeve, and a wedge movable lengthwise in the sleeve and provided with a longitudinal pin-groove a portion of which is shallower than the pin adapted to lie in the groove, whereby the pin is clamped between the bottom of said groove and the opposing wall of the sleeve when the wedge is tightened, substantially as set forth.

2. A pin-guard, comprising a sleeve adapted to surround a pin and provided with a flaring bore, and a clamping-wedge arranged in said sleeve and having a longitudinal pin-groove which increases in depth toward the front end of the wedge, substantially as set forth.

3. A pin-guard, comprising a sleeve having an internal shoulder, and a wedge movable lengthwise in the sleeve and provided at its inner end with a stop lip or flange arranged to encounter said shoulder, substantially as set forth.

4. A pin-guard, comprising a sleeve adapted to receive a pin, and a wedge arranged in the sleeve and having its outer end bent at an angle to the body of the wedge, substantially as set forth.

5. A pin-guard, comprising a sleeve adapted to receive a pin, and a wedge arranged in the sleeve and having a longitudinal pin-groove increasing in depth toward the front end of the wedge, and a laterally-bent outer end arranged in line with said groove, substantially as set forth.

Witness my hand this 26th day of October, 1903.

HENRY ROHRDANTZ.

Witnesses:
CARL F. GEYER,
EMMA M. GRAHAM.